US009424112B1

(12) United States Patent
Malamut et al.

(10) Patent No.: US 9,424,112 B1
(45) Date of Patent: Aug. 23, 2016

(54) EXECUTION PLAN GENERATOR AND EXECUTION ENGINE FOR INTERFACING WITH APPLICATION PROGRAMMING INTERFACES

(71) Applicant: EMC Corporation, Hopkinton, MA (US)

(72) Inventors: Mark David Malamut, Dana Point, CA (US); Erik Hansen, Mission Viejo, CA (US); Scott Auchmoody, Irvine, CA (US); Jeffrey Norton, Laguna Niguel, CA (US); Christopher J Hackett, Boylston, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/872,346

(22) Filed: Oct. 1, 2015

(51) Int. Cl.
*G06F 13/00* (2006.01)
*G06F 9/54* (2006.01)
*G06F 9/46* (2006.01)

(52) U.S. Cl.
CPC ............... *G06F 9/547* (2013.01); *G06F 9/466* (2013.01)

(58) Field of Classification Search
CPC .................................. G06F 8/20; G06F 9/541
USPC ............................................ 717/100; 719/328
See application file for complete search history.

(56) References Cited

U.S. PATENT DOCUMENTS 8,347,272 B2 * 1/2013 Sugawara ............... G06F 8/458
712/203
8,930,916 B1 * 1/2015 Soeder ...................... G06F 8/75
717/131

* cited by examiner

*Primary Examiner* — Andy Ho
(74) *Attorney, Agent, or Firm* — Staniford Tomita LLP

(57) ABSTRACT

Embodiments for a method of interfacing with a remote application programming interface (API) by defining an execution plan using an interface definition language and a dependency configuration file to generate a constrained directed graph of hierarchically dependent functions of the API, and executing the execution plan using an executing engine that traverses the graph to call the API functions in a defined order and convert data output by a parent function call to input required by a child function call until a terminal vertex is reached that results in directing the resulting in an action such as data to persist and/or affecting the state of a system.

16 Claims, 7 Drawing Sheets

EXECUTION PLAN GENERATOR AND EXECUTION ENGINE FOR INTERFACING WITH APPLICATION PROGRAMMING INTERFACES

TECHNICAL FIELD

Embodiments are generally directed to remote application programming interfaces, and more specifically to a workflow engine for interfacing and interacting with remote APIs without requiring custom code writing.

BACKGROUND

Application developers frequently use application programming interfaces (APIs) to build software applications. An API is a set of programming instructions and standards for accessing a software application. Software vendors often release their own APIs to the public so that other software developers can design products that can access or utilizes their services. Interfacing with remote and local APIs is typically a highly repetitive task that consists of writing custom code, which comprises a great deal of tedious and quasi-repetitive functions to query, retrieve, transform, act and iterate on data that is obtained from the API. Not only must such code be written in the first instance, but also it must be regularly maintained and updated to accommodate changes to the applications and interfaces.

What is needed, therefore, is a system and method for API workflow engine that reduces the development effort and recurring support costs associated with developing applications that communicate with APIs by providing a methodology and workflow that allows application developers to interact with APIs without requiring the need to write or maintain extensive amounts of repetitive code.

Applications written for large-scale networks, such as data backup applications, such as exemplified by the Data Domain products from EMC Corp. involve the interaction of many different networked components. Performing the discovery of devices contained within a target infrastructure such as data storage arrays (e.g., VMAX, RecoverPoint, DataDomain, etc.) is a function performed by many different software products. This task also implicates the interaction of APIs, and as the software required to implement discovery is typically a rote and well-known process, writing custom code is generally a time-consuming and inefficient process.

What is yet further needed, therefore, is a programming model whereby various APIs, devices, or device types are described by configuration information that concisely describes the desired data, and without the need for writing custom code for each device or device type.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1A:
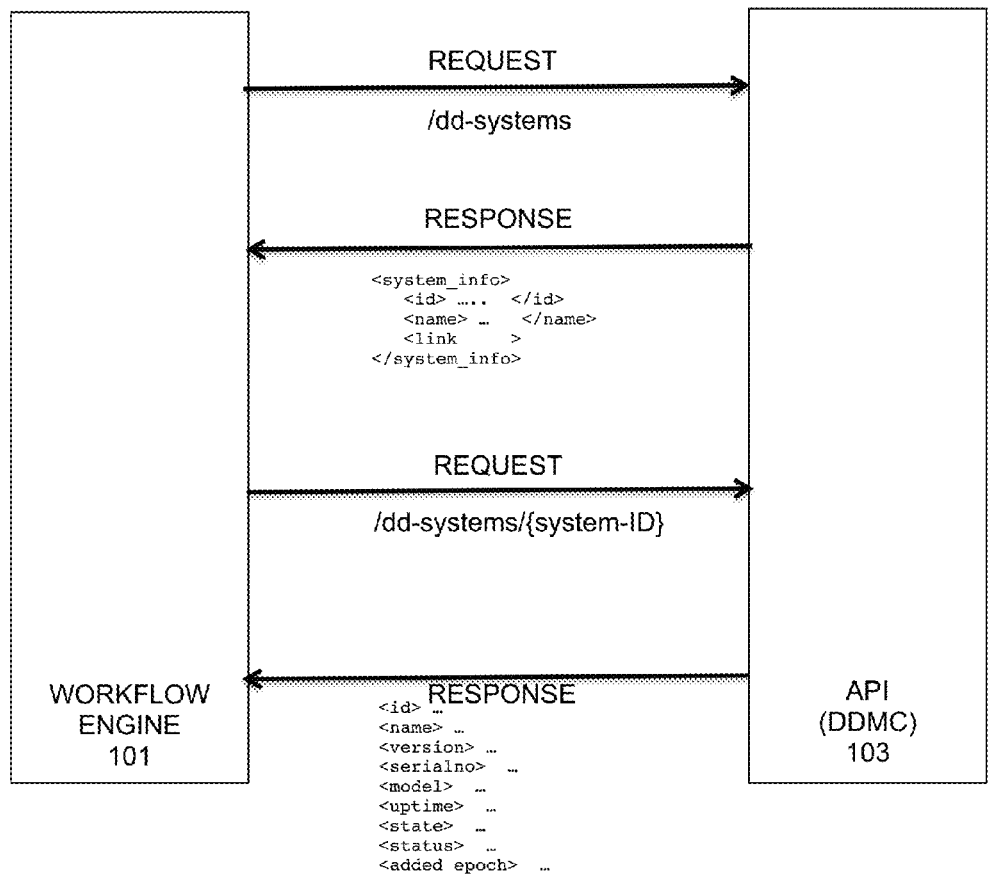
FIG. 1A illustrates a process of interfacing to a remote API using a workflow engine, under an embodiment.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Embodiments are directed to a processing component in or associated with a server computer used by a software developer to implement an application-specific action and/or persistence interface, develop a small configuration file that directs the workflow engine, and provide a file that contains the formal API definition. This is a data-centric model that frees developers from implementing specific and customized code to handle how to get data to and from an API. Built-in support is provided for authentication, list processing, data paging, data transformations and multi-threading.

Embodiments are directed to a process that is provided as a tool to software developers to solve a class of problem with respect to making calls to a remote API and processing the data that passes from one call to another in a hierarchical manner within the remote API. FIG. 1A illustrates a process of interfacing to a remote API using a workflow engine, under an embodiment. This represents a generic workflow that is performed, and is usually programmatic. A workflow engine enables this workflow to be described and implemented little to no API specific code. As shown in FIG. 1A, workflow engine interacts with a remote API 101 through a series of requests and responses. These response/request exchanges represent data access transactions comprising function calls using the API. The API is hierarchical in that a present or subsequent call is dependent on a previous call. FIG. 1A illustrates an example embodiment an API that is part of a network backup system, and specifically the Data Domain (DD) system provided by EMC Corp. Thus, API 103 may be a DataDomain Management Console (DDMC) that provides interfaces to a number of DD appliances. In general, Data Domain is a purpose-built backup appliance and has the one primary task of serving as a backup appliance as a backup to disk targets, and other figures may be described and illustrated with respect to this example. However, it should be noted that this example embodiment is intended to provide one example of a use case for the workflow engine 101 and other embodiments and implementations are also possible.

As shown in FIG. 1A, the API 103 is a remote API in that it is run on a different platform than the workflow engine 101. It may comprise an API or some other remote service that is separate from the workflow engine 101 platform or machine. As used herein, the term API (application programming interface) means a software-to-software interface that allows applications to communicate without any user knowledge or intervention. It is a set of routines, protocols, and tools for building software applications, and expresses a software component in terms of its operations, inputs, outputs, and underlying types, and defines functionalities that are independent of their respective implementations. This allows definitions and implementations to vary without compromising the interface. APIs often come in the form of a library that includes specifications for routines, data structures, object classes, and variables. An API may also simply be a specification of remote calls exposed to the API consumers, such as SOAP (Simple Object Access Protocol) and REST (Representational State Transfer) services. Throughout the description and FIGS, the term "API" may be used and should be understood to refer to a remote API or any other remote service.

Figure 1B:
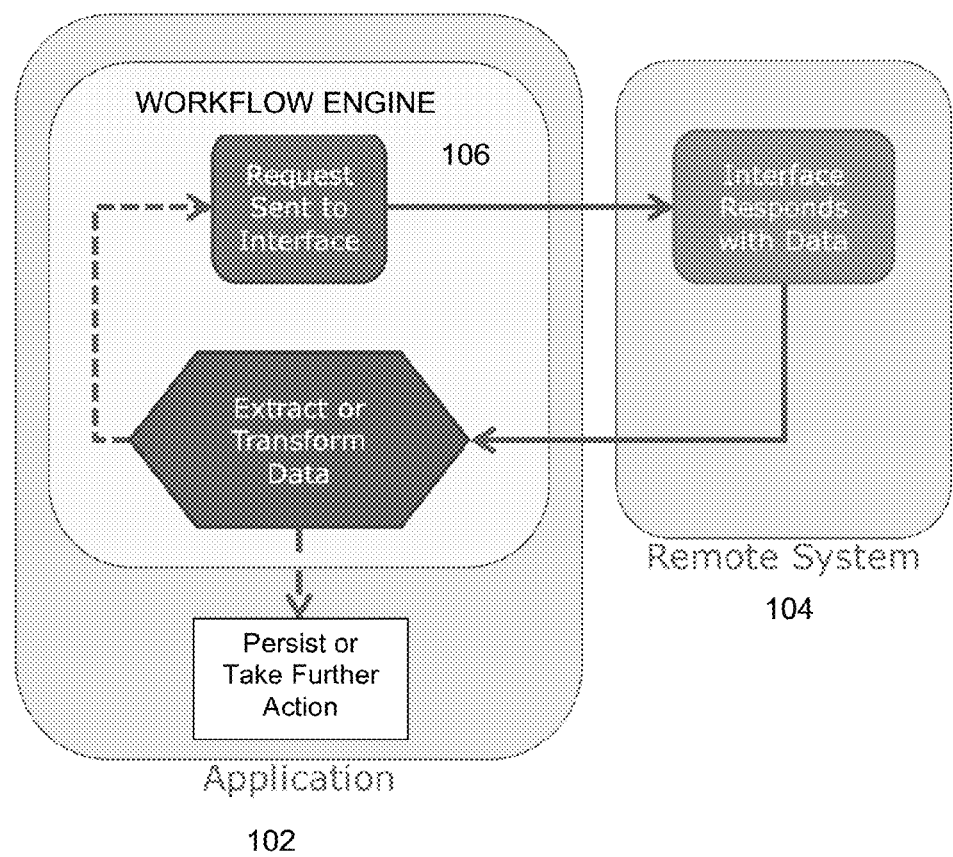
FIG. 1B is a functional diagram of an API workflow engine that significantly reduces the development effort associated with developing applications that communicate with APIs, under an embodiment.

FIG. 1B is a functional diagram of an API workflow engine that significantly reduces the development effort associated with developing applications that communicate with remote APIs, under an embodiment. As stated above, interfacing with remote APIs is traditionally a time-consuming, highly repetitive task of writing custom code to query, retrieve, transform, act and iterate on data provided by a remote (or local) API. As shown in FIG. 1B, an application 102 interacts with a remote system 104 through an appropriate API. A workflow engine 106 sends a request to the interface and the interface in turn responds with data. The workflow engine then extracts or transforms the data, and this loop either iterates through additional data request/response cycles (as shown in FIG. 1A) or ends with an action layer such as data persistence or a command that may affect the state of a system related to the application. The terminal act of processing the data through other actions, applications, storage, or any other act is referred to as the "goal" of the process, and may represent an end-user task that is performed after any core processing by the workflow engine.

In an embodiment, the workflow engine 106 can be used to perform device discovery in large-scale data networks. One typical example use case is device discovery in a data backup system with large numbers of storage devices (e.g., flash memory, disk devices, tape devices, etc.) using different network topologies (e.g., WAN/LAN, hybrid cloud, etc.). The workflow engine serves to implement a data driven discovery process that describes the desired device data in a model whereby various device types are described by configuration. This reduces or even eliminates the need to write tedious and repetitive code, which typifies current solutions to data discovery. The workflow engine approach takes advantage of the fact that interfacing with APIs is typically a rote and well-known process, and provides a reusable model to reduce repetitive coding practices. For an application within a Data Domain system, the devices may be DD appliances, or similar resources, and the API interfacing may be part of a device discovery process.

In general, API functions typically involve a very strict hierarchical ordering of the function calls to be performed. For example, a device discovery process may consist of performing a high-level or root function call that requires no inputs (other than authentication) followed by one or more lower level calls until some defined goal data is obtained and then an ultimate action by another system or application is performed. The calls between root and goal depend upon inputs which are derived from the output(s) of the higher level calls. The relationships between these function calls generally follows a strict tree-like hierarchy, thus a constrained directed graph can be used to completely describe this hierarchy. A directed graph is a set of vertices (or nodes) that are connected together, where all the edges are directed from one vertex to another, as opposed to an undirected graphs, which is a graph where the edges a bidirectional. In this constrained directed graph each graph vertex describes each function call while each graph edge describes how to map the output data from a parent call to the input data into each subsequent child call. In an embodiment, the directed graph represents a graph of function dependencies that comprises an "execution plan" that is performed by the workflow engine.

Once an execution plan exists for a device (qualified by version), it can be executed (i.e., the plan steps or graph vertices can be "walked") to call the API functions in the necessary order and convert the data output by a parent function call to the input required by a child function call. This process is repeated until a terminal (goal) vertex is reached. The execution of each goal vertex directs an action, such as storage or further processing of resultant data.

Figure 2:
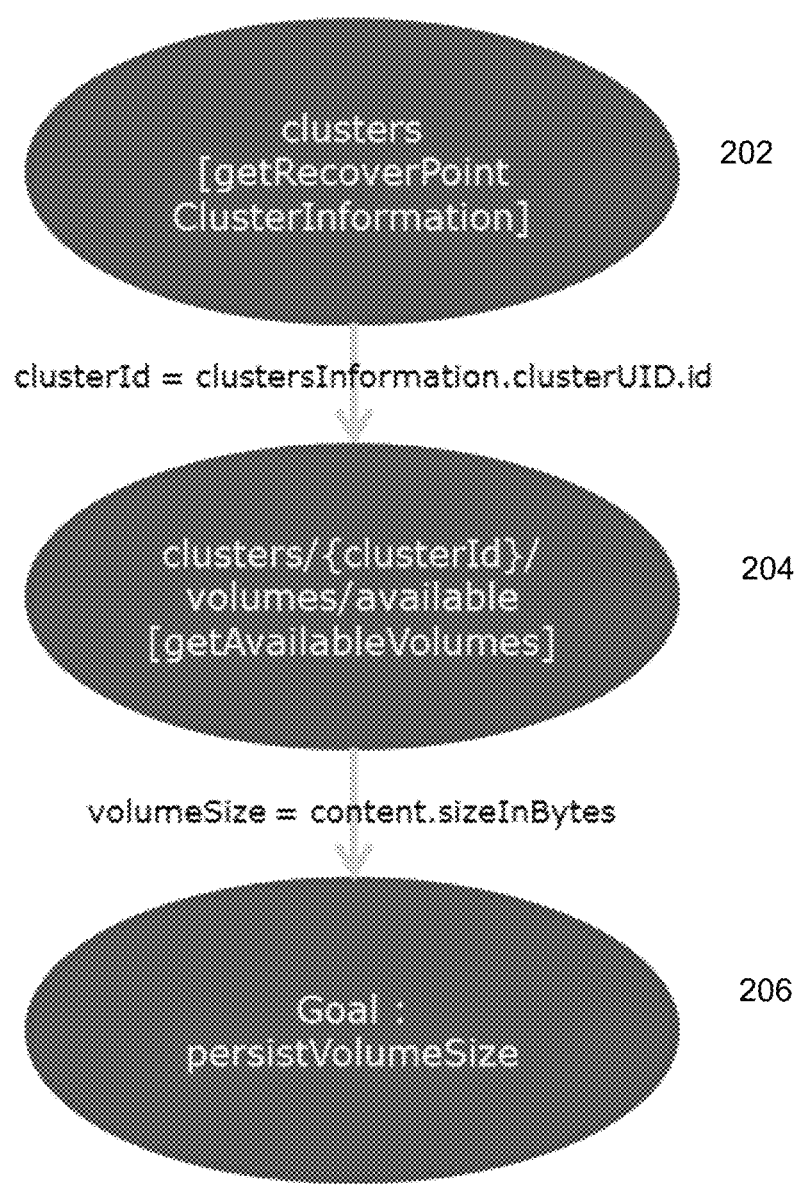
FIG. 2 is an example execution plan or sample subset of a dependency graph that could be used to achieve a specific goal, under an embodiment.

FIG. 2 is an example execution plan or sample subset of a dependency graph that could be used to achieve a specific goal, under an embodiment. As shown in FIG. 2, the goal 206 is to persist the sizes of each volume from an appliance (e.g., a RecoverPoint device) in a network backup system. The execution plan of FIG. 2 is simplified, but it highlights the hierarchal nature of the calls that need to be performed to satisfy this requirement. In practice an execution plan will often contain multiple goals. Using such a plan or dependency graph, the discovery process can be performed by walking the function calls within a graph to obtain each desired result or goal.

In the example of FIG. 2 the top vertex 202 prescribes that the URI clusters will be executed on the desired RecoverPoint device. This URI will return a composite structure. In the subsequent call to clusters/{clusterId}/volumes/available 204, the input variable clusterId (denoted by the surrounding braces) is required and needs to be extracted from the composite structure returned by the prior function call. The edge label between the top two vertices 202 and 204, clusterId=clustersInformation.clusterUID.id defines the data mapping between these vertices. The input clusterId is required by the second vertex, which can be extracted from the output data returned by the execution of the first vertex 202. The function call to clusters returns a structure named clustersInformation, which contains a sub-structure within the field named clusterUID. Furthermore the field clusterUID is also a sub-structure, which contains a field named ID, which will be mapped to the clusterId variable that is required by the second function. In this manner, the edge label can be used to map the desired output field clustersInformation.clusterUID.id into the required input field clusterId. Note that any output data at any level may be a list as opposed to a scalar and in those situations the lists are acted upon in an iterative fashion. In particular, the clustersInformation structure returns a list of clusterUIDs and the workflow engine will automatically iterate on each clusterUID structure.

Figure 3:
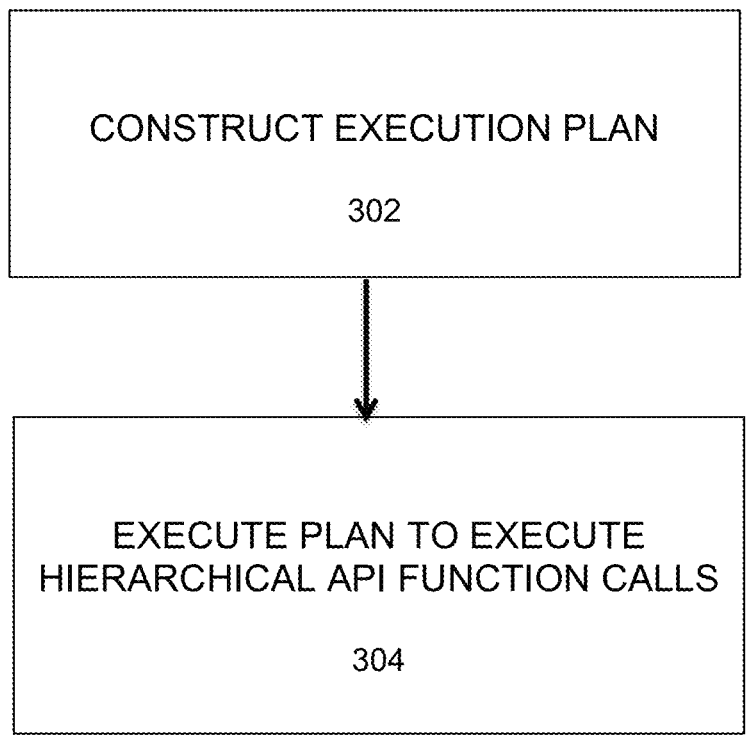
FIG. 3 is a block diagram that illustrates the two main steps of a data driven workflow, under an embodiment.

In an embodiment, there are two distinct steps that are required to perform a data driven discovery process using the workflow engine of FIG. 1B. FIG. 3 is a block diagram that illustrates the two main steps of a data driven API or device workflow process, under an embodiment. As shown in FIG. 3, the first step 302 is the construction of an execution plan by an execution plan builder component. For a specific application, such as a data discover process, a separate execution plan must exist for each version of each device to be discovered, and execution plans will only be created the first time they are needed to discover a device, at a particular version, supported by the dependency graph of the execution plan. Execution plans are automatically rebuilt whenever a change to any of the DCF or IDL plan inputs is detected. Once an execution plan or graph has been created, an execution engine uses this execution plan to execute calls against an instance of the API function calls (or the device to be discovered, in a particular example), step 304.

In general, the process of FIG. 3 is embodied within an application developer tool that provides an execution engine that performs the steps of remote API walking until the ultimate data that comprises the goal is obtained. It is then up to the application or application layer to perform whatever end-user task is required.

Execution Plan Builder

With respect to the plan construction step 302, an execution plan builder (EPB) component is responsible for reading the API function calls or device specific configurations and definitions to create a device specific execution plan. The inputs to the EPB are: (1) a dependency configuration file (DCF), which describes the mapping of data items, resultant data (goals) to be persisted, what data is to be persisted and how the device authentication is to be performed; and (2) an interface definition language (IDL), which describes the API functions and data inputs and outputs for each function. In the case of most ReST providers, industry standard files such as the WADL and XSDs are available and can be used directly. In the case where IDLs are not available, a custom built IDL can be constructed. In addition, the DCF includes data transformations, in which, under certain circumstances, output data from a function will need to be transformed before being used by a child function. In an embodiment, XSLT transformations and GroovyShell script transformations are used, where XSLT is an industry standard that defines how to remap an XML input document to an XML output document; and GroovyShell is a java-based scripting language that enables run-time evaluation. This is useful in the cases where custom logic needs to be applied to the output data to modify, filter or otherwise alter the data to be used as input to a subsequent function call. Transforms are typically embedded directly in the DCF, but they may also referenced in the DCF by a URI or other link or reference.

Figure 4:
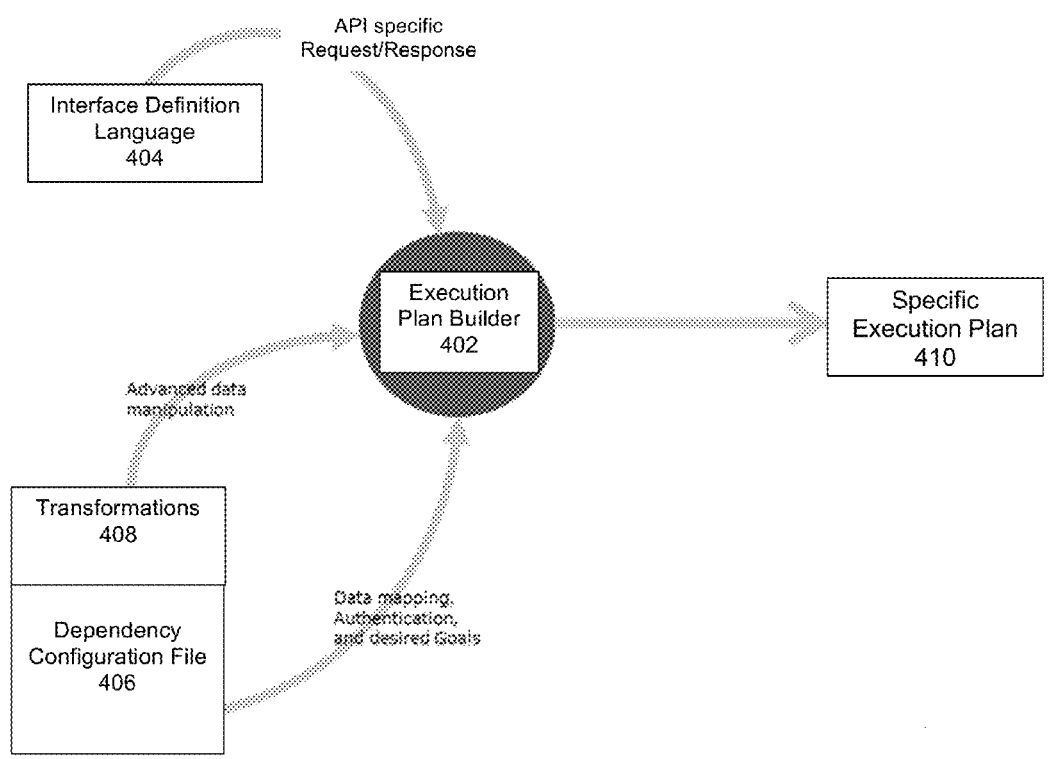
FIG. 4 is a flow diagram that illustrates data flow for an execution plan builder, under an embodiment.

FIG. 4 is a flow diagram that illustrates data flow for an execution plan builder, under an embodiment. As shown in FIG. 4, the IDL 402, DCF 404, and possible transformations 406 are input and processed by the execution plan builder 402, which then generates the device specific execution plan 410. The IDL 402 is a document that describes the APIs and data structures use by a device (e.g., WADL, WSDL, XSD), where WADL (web application description language) is an XML document that describes the APIs and data structures used by a ReST-based device and WSDL (web services description language) is an XML document that describes the APIs and data structures used by a web service, XSD (XML schema definition) is an XML document that describes the data structures reference by a WADL. The DCF provides information regarding how to access an API, the application goals to be retrieved via the API and data transformations. XSLT (extensible stylesheet language) is an XML document that describes XML formatting and manipulations and which are used to describe data transformations; it is an example of a standard used to define transforms. The execution plan basically comprises a plan to traverse the API to achieve certain goals. The execution plan is a list of dependency functions to obtain specific data, and the transformation specific API calls required to achieve the path.

In an embodiment, the execution plan builder 402 receives the input IDL and DCF files and computes a hash on the file to determine whether or not a plan already exists that matches those files. If the plan exists and there are no changes, then the plan is executed. In this way, a plan can be built once and re-used. Any change in the DCF (or more infrequently the IDL) will cause a new plan to be generated. In the case of a change or first time use, the files are read and analyzed. The builder walks through the IDF and builds an internal graph of calls and interdependencies of all of the calls. The DCF defines which parts of the API graph need to be executed to achieve the goal, which represents the terminal data event (e.g., persistence or default action). The plan thus comprises (1) dependent function calls to obtain a specific piece of data, and (2) data transformations specific to the dependency of the functions (as required by the API or application) in order to achieve the goal.

Figure 5:
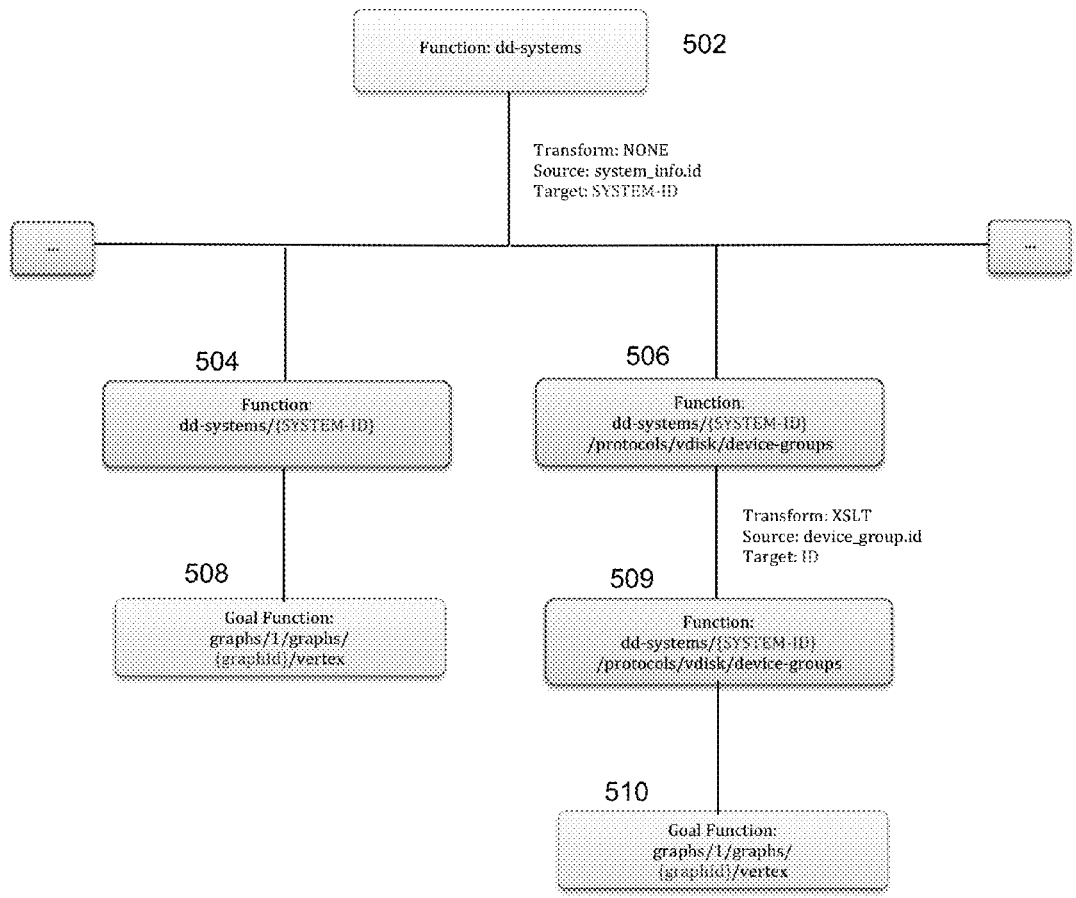
FIG. 5 illustrates a sample execution plan for a data domain operation, under an embodiment.

For the example of device discovery, once a plan has been constructed for a specific device (and version of a device), it can be re-used for additional API functions, device instances and device re-discovery. The execution plan is used as input by the execution engine, which executes the API functions, performs data mapping and processes the goal data in a subsequent or external application or subsystem or takes other actions as prescribed in the DCF. FIG. 5 illustrates a sample execution plan for a data domain operation, under an embodiment, and uses the example implementation of a DD-based backup system. As shown in the example of FIG. 5, there is a parent function 502 (Function: dd-systems) and function calls to two subsequent functions 504 and 506, each with their own goals 508 and 510, and the 506 function involves a transform and an intermediate function 509. The plan of FIG. 5 illustrates the hierarchical nature of the function calls and the steps (or graph vertices) that are traversed to reach the goal or goals.

Execution Engine

Once an execution plan has been formulated, an execution engine is responsible for running the plan (such as a device discovery job) and acting upon the results. Using the appropriate execution plan, specific device connection details and credentials (all supplied on the initiating execution engine API function interface). The engine executes the plan, such as by performing the steps of the plan or walking a dependency graph, and executing the API function on each vertex as necessary. The execution engine begins executing interface calls with no dependencies, and then traverses any subsequent interface calls needed to satisfy all goals.

Figure 6:
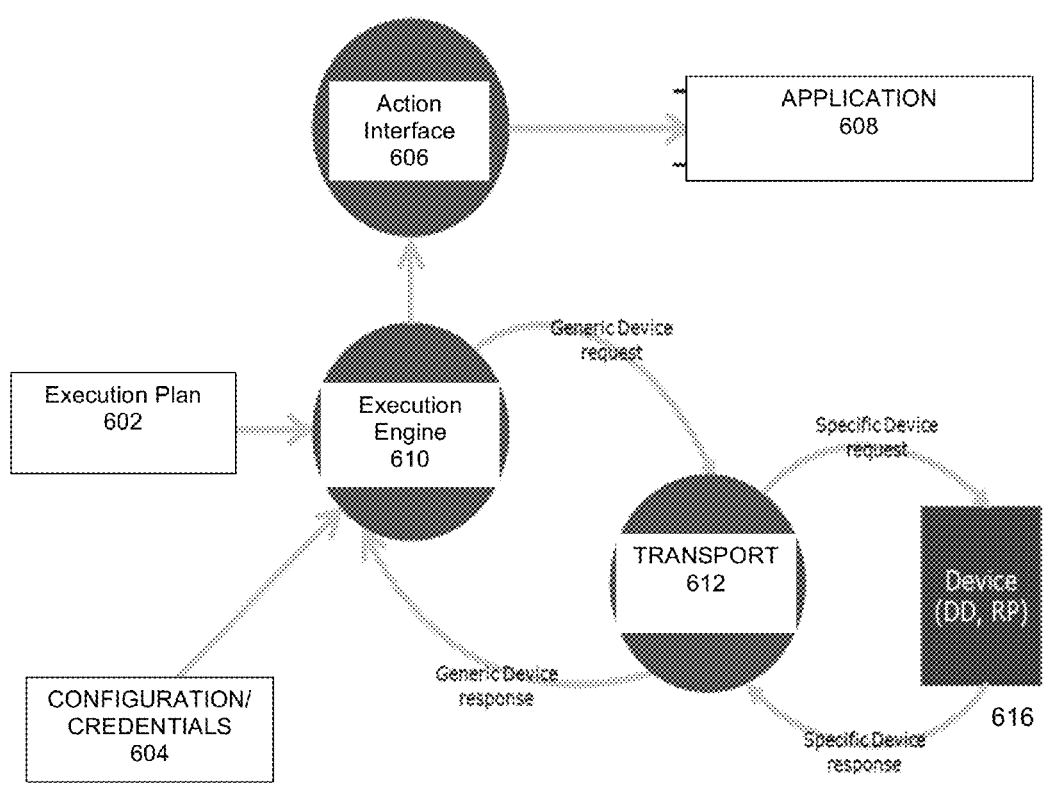
FIG. 6 illustrates operation of the execution engine, under an embodiment.

FIG. 6 illustrates operation of the execution engine, under an embodiment. As shown in FIG. 6, execution plan 602 is input to execution engine 610 along with appropriate configuration and credential information 604, which allows for connection to the remote API and includes API location, user name, password, and so on. The execution engine 610 basically performs three tasks: (1) it traverses the steps of the execution plan 602 (walks the plan), (2) interfaces with a transport function 612, which communicates with the API through appropriate protocols, and (3) executes any transforms included or referenced within the plan. With respect to transports, embodiments of the execution engine have been described in conjunction with the ReST transport protocol. Additional transports such as SMI-S, WMI and SSH may also be used. In general, each DCF contains information regarding what to do with data to achieve a goal and this data is ultimately used by an application or other end-user process. Thus, as shown in FIG. 1, the execution engine may also be functionally coupled to an action interface 606 which interfaces with an application 608 in the application layer to, for example, further process or store the data. For a device discover application, device 616 in the device layer may be accessed by the transport 612 to return specific device data in response to a request.

For example, with reference to FIG. 2, the call to the URI clusters can be performed at any time as it has no inputs while the URI clusters/{clusterId}/volumes/available can only be called after the input clusterId has been obtained. In this example graph, the goal persistVolumeSize cannot be satisfied until the parent vertex URI clusters/{clusterId}/volumes/available has been executed. This call cannot execute until the input clusterId is available which requires the execution of the URI clusters. As clusters require no inputs, it is the first call executed which then allows the subsequent calls to be executed. This will result in the eventual execution of the goal that will perform an action or persistence operation. The goal persistence operation is specified in the DCF and will be a ReST POST to the URI specified in the DCF goal. As an example, the goal URI could be a reference to a URI topology/recoverPointVolumeSize. The data to be sent in the body of the ReST POST will be the data output from the preceding URI after performing any transformations (such as XSLT or Groovy). The extensible design of the execution engine allows for additional transport protocols beyond ReST, (e.g.—SMI-S, SSH) to be implemented as necessary. Furthermore, this engine is intended to work regardless of any device specifics such as the transport protocol, authentication model, device API and data exchange language (e.g., XML, JSON, etc.)

To ensure efficiency, once a vertex has been executed its relevant output data is cached during each execution of a plan so as to avoid re-execution of any function call. For example, the system may assume the URI clusters had been called during the execution of a different goal prior to the goal persistVolumeSize. In this case, as clusters was previously executed the value of clusterId will be cached such that the clusters URI will not be re-executed during this single execution plan run. It should be noted that in practice, function calls may return multiple instances of a structure. For example, the call to clusters returns a list of structures. The execution logic automatically handles the return data whether this data is a scalar or list. No special notation or logic in the DCF or graph is required. This is automatically detected and properly handled at execution engine run-time.

With respect to authentication, the execution engine may be configured to support certain different authentication models, such as: (1) None—no authentication; (2) HTTP BASIC—simple username and password supplied in the HTTP Header; and (3) TOKEN—an authentication URI is provided which returns a token to be supplied on all subsequent function calls. A new token is acquired automatically by the execution engine when an old token is no longer valid. Additional authentication models will be added as needed.

With respect to goal definition, the end result or goal in case of a data driven discovery is typically to persist the discovered data and the dependency configuration file will typically specify multiple goals. Each goal will specify a single data item or structure to be persisted (e.g., Storage Array, Disk Pools, Management Devices, etc.) and the execution engine will persist as many instances of these data entities as exists on the target device. Each goal action is specified within the goal attribute of a dataPair. Following is an example of a DCF goal dataPair specification, under some embodiments.

```
<dataPair>
  <source value="dd:dd systems"/>
  <transform type="XSLT" path="DataDomainTransform
    ManagementDevice.xsl"/>
  <goal name="TOPO_MANAGEMENT_DEVICE"
    function="graphs/graph/{graphID}/vertex"/>
</dataPair>
```

In the above example, a graph service function graphs/graph/{graphId}/vertex will be executed on the output data from the device API dd:dd systems after the data has been transformed by the named XSLT DataDomainTransformManagementDevice.xsl. DataPairs are used to map data sources to targets and do not always contain a goal. DataPairs that do not contain a goal are used to define data mappings that are needed for the eventual execution of a goal.

Following is an example of a DCF mapping dataPair specification, under some embodiments.

```
<dataPair>
  <source
    value="recoverPointClustersInfomration.clusters
      Information.clusterUID.id"/>
  <target value="clusterID"
    resource="clusters\/\{clusterId\}\/volumes\/available"/>
</dataPair>
```

This example specifies the relationship between 202 and 204 as illustrated in FIG. 2.

With respect to goal execution, in order to support a flexible goal model, the goal definition specifies a function or interface, which is called with the collected data. The function or interface used by the goal may be internal to the execution engine or an external process, under some embodiments.

Depending on implementation, there may also be a designation for the location of the server where the execution plans are stored. Different servers may or may not be employed. As the goal URIs may contain a variable, values may be specified to the execution engine API before the start of any job. In the above example, a goal execution model (e.g., persistence) is implemented using a very simple model for testing. Goal data is stored in a vertex on the graph server on located on vmad-157. The goal URI requires a graphId to be supplied at run-time. This separation of the goal server and the DCF goal URIs allows the goal server used to be modified at run-time via the properties files while the goal execution model is isolated into the execution plan via the DCF. Alternatively, a more sophisticated goal execution model may be implemented whereby the goals and the persistence model are further de-coupled. This allows changes to the model without requiring any changes to the DCF.

The workflow engine system comprising the execution plan and execution engine allows for a great deal of flexibility. Although embodiments have been described with respect to device discovery, it should be noted that this is just one example application of the execution plan and workflow engine methodology, and such methodology may be applied to many other applications as well. Namely, any other problem domain where a hierarchy of data retrievals or actions exist in conjunction with a final goal execution model, control execution, or general data processing/storage operation or application.

With respect to a specific example of device discovery, the high-level requirements that are satisfied include support for multiple device types (e.g. Data Domain, RecoverPoint, VMAX), providing an extensible architecture that supports additional device types, support for multiple data exchange formats (e.g. JSON, XML), support for multiple authentication models (e.g. HTTP BASIC, TOKEN) and for multiple transport methods (e.g. HTTP, ReST, SNMP, SSH, etc.). It utilizes a concise configuration file to describe the data to be extracted, and allows device extracted data to be transformed as necessary. For example, for device discover, it persists the extracted data to a topology API using a loosely coupled definition; and utilizes existing system API Interface Definitions Files (IDLs) such as ReST-based WADL and XSDs when available.

The advantages of using a configuration or "data driven" approach for API interfacing is that new definitions can easily be added by a variety of users such as developers, system administrators, support personnel and third parties, and no code modification are required except in rare circumstances. The process uses existing IDL's when available, and many defect repairs (e.g., bug fixes, patches, etc.) can be deployed very quickly without the need to wait for a software release (e.g.—Service Pack) cycle. Updates can be applied without service interruption, and defects are reduced, thus lowering development costs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of interfacing with a remote application programming interface (API), comprising:
   a processor-based execution plan builder defining an execution plan using an interface definition language and a dependency configuration file to generate a constrained directed graph of hierarchically dependent functions of the API; and
   a processor-based execution engine executing the execution plan using an executing engine that traverses the graph to call the API functions in a defined order and convert data output by a parent function call to input required by a child function call.

2. The method of claim 1 wherein the graph comprises a plurality of vertices and edges, and wherein each vertex describes each function call, and wherein each edge describes a mapping of output data from a parent call to the input data into each subsequent child call.

3. The method of claim 1 further comprising converting the data output by the parent function call to the input required by the child function call until a terminal vertex is reached.

4. The method of claim 2 wherein a terminal vertex represents a goal that directs a resulting action.

5. The method of claim 1 wherein the interface definition language describes the API functions and data inputs and outputs for each function.

6. The method of claim 1 wherein the dependency configuration file describes a mapping of data items, goals to be achieved, and interface connection details.

7. The method of claim 6 wherein the dependency configuration file includes transformations to transform output data from a parent function prior to use by a child function.

8. The method of claim 1 wherein the execution plan is generated by a plan builder that analyzes interface definition language files and dependency language files to determine if a current valid plan exists, and if not, generates an execution plan of function calls and interdependencies of the API function calls.

9. The method of claim 1 wherein the API comprises a set of functions configured to process data within a large-scale data backup network comprising a plurality of backup appliances, and wherein the set comprises a root function call followed by one or more low-level calls that are executed until goal data is obtained and an action is taken, and wherein the calls between root function and goal depend upon inputs that are derived from outputs of one or more higher level calls.

10. A system for interfacing with a remote application programming interface (API), comprising:
   an execution plan builder processing component of a server computer generating an execution plan using an interface definition language and a dependency configuration file to generate a constrained directed graph of hierarchically dependent functions of the API; and
   an execution engine processing component of the server computer, executing the execution plan using an executing engine that traverses the graph to call the API functions in a defined order and convert data output by a parent function call to input required by a child function call until a terminal vertex is reached, the terminal vertex representing a goal for further processing of the data.

11. The system of claim 10 wherein the graph comprises a plurality of vertices and edges, and wherein each vertex describes each function call, and wherein each edge describes a mapping of output data from a parent call to the input data into each subsequent child call.

12. The system of claim 11 wherein the interface definition language describes the API functions and data inputs and outputs for each function.

13. The system of claim 10 wherein the dependency configuration file describes a mapping of data items, goals to be achieved, and interface connection details.

14. The system of claim 13 wherein the dependency configuration file includes transformations to transform output data from a parent function prior to use by a child function.

15. The system of claim 10 wherein the execution plan builder analyzes interface definition language files and dependency language files to determine if a current valid plan exists, and if not, generates an execution plan of function calls and interdependencies of the API function calls.

16. A computer program product, comprising a non-transitory computer-readable medium having a computer-readable program code embodied therein, the computer-readable program code adapted to be executed by one or more processors to interface with a remote application programming interface (API), comprising:
   defining an execution plan using an interface definition language and a dependency configuration file to generate a constrained directed graph of hierarchically dependent functions of the API; and
   executing the execution plan using an executing engine that traverses the graph to call the API functions in a defined order and convert data output by a parent function call to input required by a child function call.

* * * * *